C. P. STEINMETZ.
THERMOMETER.
APPLICATION FILED OCT. 3, 1904.
935,940.
Patented Oct. 5, 1909.
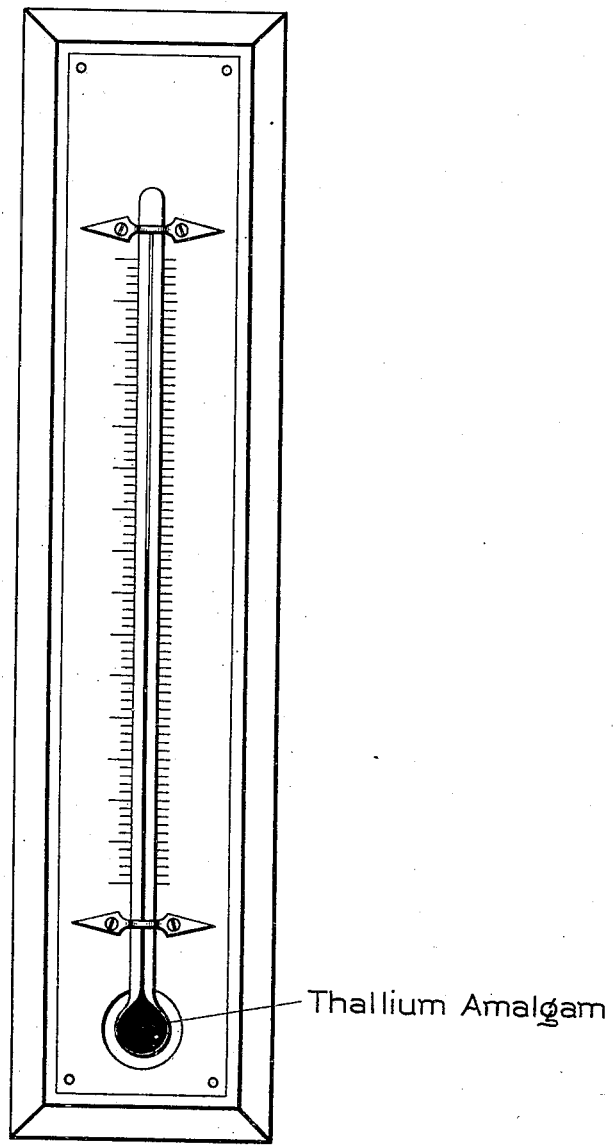
Thallium Amalgam
Witnesses:
George H. Tilden.
Helen Orford
Inventor:
Charles P. Steinmetz
by Albert G. Davis
Att'y.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

THERMOMETER.

935,940.  Specification of Letters Patent.  Patented Oct. 5, 1909.

Application filed October 3, 1904. Serial No. 226,886.

*To all whom it may concern:*

Be it known that I, CHARLES P. STEINMETZ, a citizen of the United States, residing at Schenectady, county of Schenectady, State of New York, have invented certain new and useful Improvements in Thermometers, of which the following is a specification.

It is a well-known fact that mercury solidifies at a temperature of approximately −40° C. and is therefore unsuited for use in thermometers and other thermometric instruments when the temperature to be measured is below that value. Even at −35° C. mercury becomes viscous and unsuited for thermometric purposes.

I have found that certain amalgams of thallium remain liquid at temperatures much lower than this and even as low as −60° C., and are therefore suitable for thermometric purposes at temperatures considerably lower than that at which mercury solidifies.

The accompanying drawing shows a thermometer of ordinary form having a transparent container in which the thallium amalgam is used in place of mercury for the expansible fluid.

The exact proportion of thallium and mercury may be varied through a considerable range. With a slight addition of thallium, say a fraction of 1 per cent., the freezing point of the amalgam is slightly lower than that of pure mercury, about −40° C., but with continued additions of the thallium the freezing point continues to fall until at 10 per cent. thallium the freezing point is about −60° C. This temperature is lower than any found in nature on earth. With additions of thallium greater than 10 per cent. the freezing point rises progressively until, at nearly pure thallium, it is in the neighborhood of 290° C.

What I claim as new and desire to secure by Letters Patent of the United States, is,

1. A thermometric instrument comprising a transparent envelop and a temperature indicating fluid therein containing thallium and mercury in such proportions that the freezing point of the fluid is lower than that of mercury.

2. A thermometric instrument comprising a suitable container and a thallium amalgam therein having a freezing point lower than −35 degrees C.

3. A thermometer having a transparent tube, and an expansible fluid therein consisting of a thallium amalgam containing substantially 10% thallium.

In witness whereof I have hereunto set my hand this first day of October, 1904.

CHARLES P. STEINMETZ.

Witnesses:
HELEN ORFORD,
G. C. HOLLISTER.